(12) United States Patent
Wu et al.

(10) Patent No.: US 9,347,513 B2
(45) Date of Patent: May 24, 2016

(54) HYDRAULIC DAMPER FOR ELECTRICAL SWITCHING APPARATUS AND METHOD

(71) Applicant: GENERAL ELECTRIC COMPANY, Schenectady, NY (US)

(72) Inventors: Jin Wu, ShangHai (CN); Yu Lu, ShangHai (CN); Wenhua Que, ShangHai (CN); Hao Wu, ShangHai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/303,182

(22) Filed: Jun. 12, 2014

(65) Prior Publication Data

US 2014/0367212 A1    Dec. 18, 2014

(30) Foreign Application Priority Data

Jun. 13, 2013    (CN) .......................... 2013 1 0232599

(51) Int. Cl.
*F16F 9/44* (2006.01)
*H01H 3/60* (2006.01)
*F16F 9/48* (2006.01)

(52) U.S. Cl.
CPC ................ *F16F 9/443* (2013.01); *H01H 3/605* (2013.01); *F16F 9/483* (2013.01)

(58) Field of Classification Search
CPC ............... F16F 9/44; F16F 9/443; F16F 9/48; F16F 9/483; F16F 9/0272; F16F 9/0245
See application file for complete search history.

(56) References Cited

U.S. PATENT DOCUMENTS

| 2,733,058 | A | * | 1/1956 | Reese ..................... B60R 19/26 267/234 |
| 4,515,253 | A | | 5/1985 | Itoh |
| 4,793,452 | A | | 12/1988 | Kong |
| 4,958,706 | A | | 9/1990 | Richardson et al. |
| 8,256,588 | B2 | | 9/2012 | Mori |

(Continued)

FOREIGN PATENT DOCUMENTS

| DE | 102006025579 B3 | * | 12/2007 | ............ F16F 9/3485 |
| DE | 102010030542 A1 | * | 12/2011 | |
| FR | 2389046 A1 | * | 11/1978 | |

(Continued)

OTHER PUBLICATIONS

Electronic Translation of FR2389046A1.*

(Continued)

*Primary Examiner* — Anna Momper
(74) *Attorney, Agent, or Firm* — GE Global Patent Operation

(57) ABSTRACT

A hydraulic damper for an electrical switching apparatus includes a damper enclosure including an inner wall. Also included is a chamber defined by the inner wall, the chamber having a first end, a second end. Further included is a tapered portion of the chamber extending from a tapered portion initial end to a tapered portion terminal end, the tapered portion angled inwardly in a direction from the first end toward the second end of the chamber. Yet further included is a press rod at least partially disposed within the chamber. Also included is a piston having a piston outer surface and disposed within the chamber and having an initial position adjustable in a longitudinal direction of the chamber. Further included is a gap defined by the piston outer surface and the inner wall, wherein adjustment of the piston in the longitudinal direction adjusts the gap.

14 Claims, 2 Drawing Sheets

(56) References Cited

U.S. PATENT DOCUMENTS

| | | | |
|---|---|---|---|
| 8,448,760 B1 * | 5/2013 | Houtsma | 188/284 |
| 2006/0131118 A1 | 6/2006 | Huang | |
| 2007/0144848 A1 | 6/2007 | Saito | |
| 2012/0074660 A1 * | 3/2012 | Thomas | F16F 9/56 280/5.514 |
| 2012/0325603 A1 | 12/2012 | Ootake et al. | |

FOREIGN PATENT DOCUMENTS

| | | |
|---|---|---|
| JP | 2012013226 A | 1/2012 |
| KR | 1540422 B1 | 10/1998 |

OTHER PUBLICATIONS

Czop et al., "Six Sigma Methodology Applied to Minimizing Damping Lag in Hydraulic Shock Absorbers", Control and Measuring Systems Department, vol. 49, Issue 2, pp. 01-08, Dec. 1, 2011.

\* cited by examiner

HYDRAULIC DAMPER FOR ELECTRICAL SWITCHING APPARATUS AND METHOD

BACKGROUND OF THE INVENTION

The subject matter disclosed herein relates to electrical switching apparatuses, and more particularly to an adjustable hydraulic damper, as well as a method of adjusting the hydraulic damper.

A hydraulic damper, such as an oil damper, may be employed to stop a high speed object in a short distance and absorb a shock associated therewith. The hydraulic damper may include a damper enclosure for a chamber defined by an inner wall of the damper enclosure. Typically, the inner wall is cylindrical and has a substantially uniform cross-sectional area with a piston located within the chamber. The shock absorption function results from a dampening force that is dependent on several variables, including fluid viscosity, piston length, piston diameter, a gap between the piston and the inner wall of the chamber, and piston velocity.

Various applications employ a hydraulic damper and comprise distinct mechanical characteristics which make the desired initial dampening force of the hydraulic damper different based on the particular application. Often, operators must manually add or switch damper arrangements for the application until obtaining satisfactory characteristics after testing the application. Unfortunately, this effort is time consuming and costly.

BRIEF DESCRIPTION OF THE INVENTION

According to one aspect of the invention, a hydraulic damper for an electrical switching apparatus includes a damper enclosure including an inner wall. Also included is a chamber defined by the inner wall, the chamber having a first end, a second end. Further included is a tapered portion of the chamber extending from a tapered portion initial end to a tapered portion terminal end, the tapered portion angled inwardly in a direction from the first end toward the second end of the chamber. Yet further included is a press rod at least partially disposed within the chamber. Also included is a piston having a piston outer surface and disposed within the chamber and having an initial position adjustable in a longitudinal direction of the chamber. Further included is a gap defined by the piston outer surface and the inner wall, wherein adjustment of the piston in the longitudinal direction adjusts the gap.

According to another aspect of the invention, a hydraulic damper enclosure includes a chamber defined by an inner wall of the hydraulic damper enclosure and having a first end and a second end, the chamber extending in a longitudinal direction of the hydraulic damper enclosure. Also included is a tapered portion of the chamber defining a varying cross-sectional area. Further included is a piston having a piston outer surface and disposed within the chamber proximate the tapered portion. Yet further included is an adjustable gap defined by the piston outer surface and the inner wall.

According to yet another aspect of the invention, a method of adjusting an initial position of a piston of a hydraulic damper is provided. The method includes engaging an adjustment component operatively coupled to an end of a piston configured to rotate about a threaded engagement. The method also includes translating the piston in a longitudinal direction upon rotation of the adjustment component. The method further includes adjusting a gap defined by a piston outer surface and an inner wall of a chamber upon translation of the piston in the longitudinal direction.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
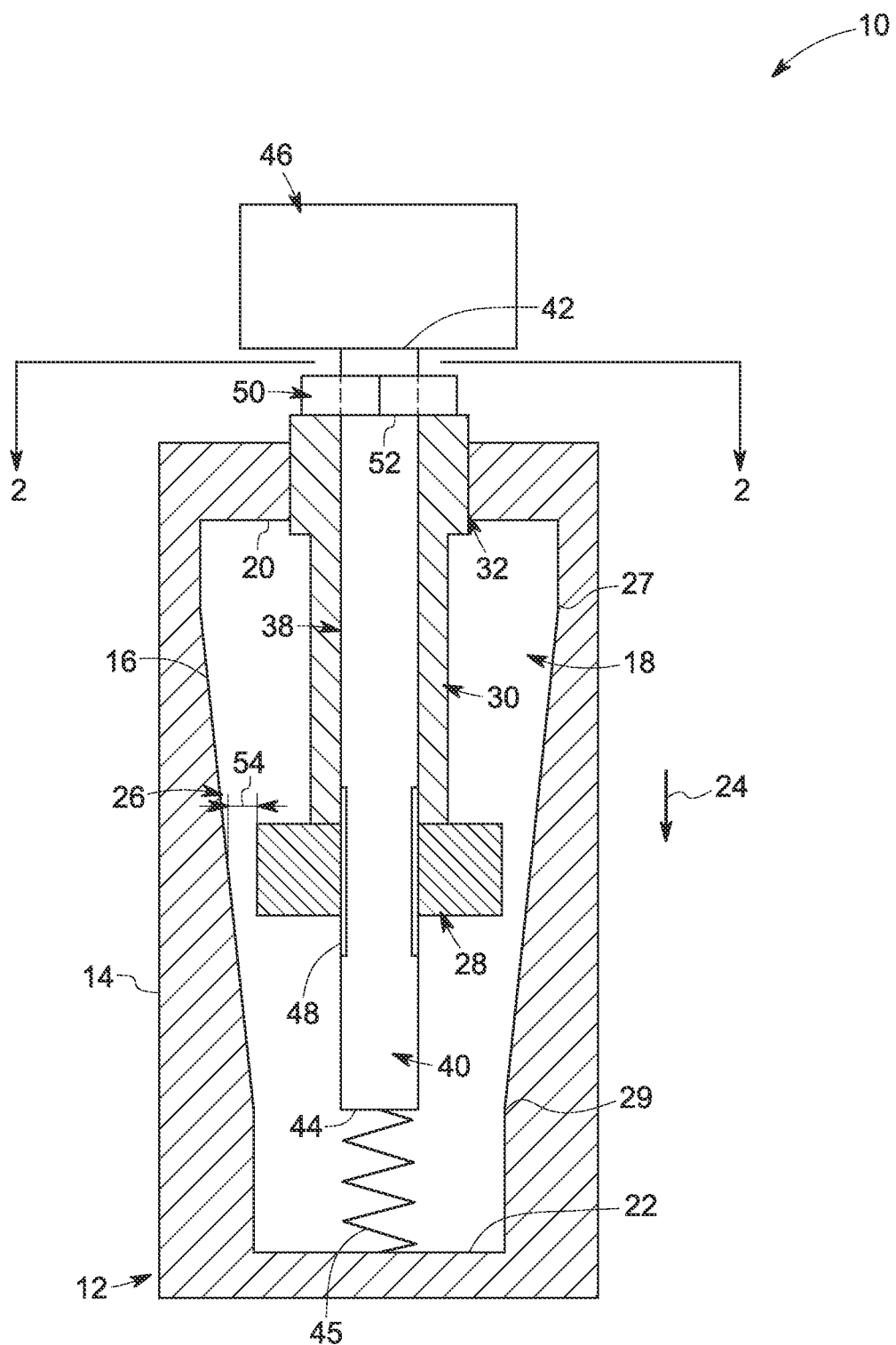
FIG. 1 is a partial cross-sectional view of a hydraulic damper.

Referring to FIG. 1, a hydraulic damper is illustrated and generally referred to with numeral 10. The hydraulic damper 10 is employed to affect a moving object by resisting motion via viscous friction imparted by a fluid, such as oil, for example. The hydraulic damper 10 may be used in many applications and in one embodiment is used in conjunction with an electrical switching apparatus (not illustrated). More particularly, the hydraulic damper 10 may be configured to associate with movable members of a circuit breaker.

As shown, the hydraulic damper 10 includes an enclosure 12 having an outer wall 14 and an inner wall 16. The inner wall 16 defines a chamber 18 extending from a first end 20 to a second end 22 in a longitudinal direction 24. At least a portion of the inner wall 16 comprises a tapered portion 26 that is disposed at an angle to the longitudinal direction 24. Specifically, the tapered portion 26 extends from a tapered portion initial end 27 to a tapered portion terminal end 29 and angles inwardly in a direction from the first end 20 to the second end 22 of the chamber 18. The tapered portion 26 of the chamber 18 may form simply a portion of the entire length of the inner wall 16 or may span the entire distance of the chamber 18. Specifically, the tapered portion initial end 27 and/or the tapered portion terminal end 29 may be located proximate the ends 20, 22, or at any intermediate location relative to the ends 20, 22. It is contemplated that the tapered portion 26 angles outwardly in a direction from the first end 20 to the second end 22 of the chamber 18, but the inwardly angled embodiment is illustrated and will be described for purposes of description.

The chamber 18 may be formed in numerous cross-sectional geometries. In one embodiment, the chamber 18 comprises a substantially circular cross-sectional area. However, the tapered portion 26 of the inner wall 16 provides a varying cross-sectional area within the chamber 18. In an embodiment comprising a substantially circular cross-sectional area, the tapered portion 26 provides a varying diameter for at least a portion of the chamber 18. The benefits associated with the varying cross-sectional area will be appreciated from the description below.

The hydraulic damper 10 includes a piston 28 disposed in the chamber 18, the piston 28 having a rod portion 30 extending in the longitudinal direction 24 and through an aperture 32 proximate the first end 20 of the chamber 18. The rod portion 30 is operatively coupled to the enclosure 12 proximate the first end 20 of the chamber 18. More particularly, the rod portion 30 is engaged with the aperture 32 in a sliding relationship, such that the rod portion 30 is free to translate through the aperture 32. One or more sealing components (not illustrated) may be included at an interface between the rod portion 30 and the aperture 32 to facilitate sealing of the chamber 18.

The piston 28 and the rod portion 30 include a hollow portion 38 extending axially therethrough in the longitudinal direction 24. The hollow portion 38 is configured to fittingly receive and retain a press rod 40 therein. The press rod 40 includes a press rod outer surface 42 that, in one embodiment, is substantially cylindrical but in any event, the shape corresponds to the shape of the hollow portion 38. In this manner, the press rod 40 and the piston 28 are coaxially aligned in one embodiment. It is contemplated that the piston 28 is partially disposed within a hollow portion of the press rod 40. In either event, the press rod 40 extends from a press rod first end 42 to a press rod second end 44. The press rod first end 42 extends to an external location of the enclosure 12 and is operatively coupled to a force receiving element 46. The press rod second end 44 is disposed within the chamber 18 and is operatively coupled to the second end 22 of the chamber 18 with a resilient member 45. The resilient member 45 comprises any component or arrangement that resiliently biases the press rod 40 to an initial position, such as a spring or sealed compressible fluid container, for example. A portion of the press rod outer surface 42 comprises a threaded portion 48 that is engaged with the hollow portion 38 of the piston 28, which also includes a threaded region. Alternative engagement arrangements between the piston 28 with the press rod outer surface 42 are contemplated. In one embodiment, engagement is facilitated by a plurality of balls of a ball-screw arrangement.

Figure 2:
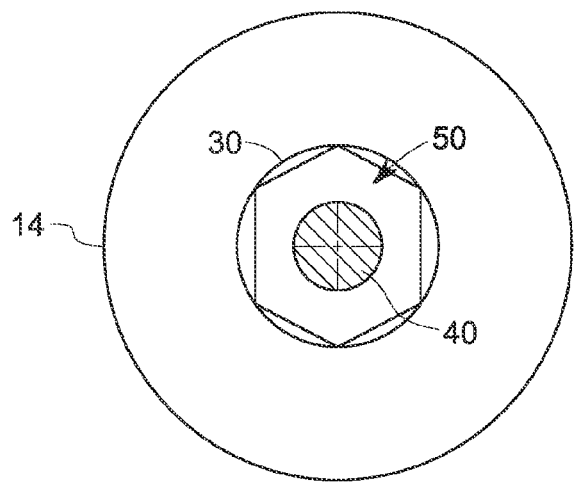
FIG. 2 is a top sectional view taken along line 2-2 of FIG. 1.

In addition to providing an operative coupling between the piston 28 and the press rod 40, the threaded engagement allows the piston 28 to be adjusted in the longitudinal direction 24 upon rotation of the piston 28. Such rotation is facilitated by the inclusion of an adjustment component 50 operatively coupled to the rod portion 30 of the piston 28. Specifically, the adjustment component 50 is positioned along a length of the rod portion 30 and in one embodiment at an end 52 of the rod portion 30. The adjustment component 50 may be operatively coupled to the rod portion 30, and therefore the piston 28, or may be integrally formed with the rod portion 30 and the piston 28. Irrespective of the precise structural formation, the adjustment component 50 is configured to be rotated, thereby causing rotation of the piston 28 around the press rod outer surface 42, and more particularly around the threaded portion 48. As the piston 28 is rotated, the piston 28 and rod portion 30 are translated in the longitudinal direction 24 toward either the first end 20 or the second end 22 of the chamber 18, depending on the direction of rotation. The adjustment component 50 is located at a location external to the chamber 18, such that an operator or machine may easily interact with the adjustment component 50. In one embodiment, as shown in FIG. 2, the adjustment component 50 is a hexagonal nut that may be easily manipulated with a tool, such as a wrench, for example. It is to be appreciated that the adjustment component 50 includes a continuation of the hollow portion 38, such that the press rod 40 is retained therein as well.

Adjustment of the piston 28 in the longitudinal direction 24 in the manner described above facilitates adjustment of the initial position of the piston 28. Due to the tapered portion 26 of the inner wall 16, this axial adjustment allows adjustment of a gap 54, which may also be referred to herein as a gap, defined by a piston outer surface 56 and the inner wall 16. It is to be appreciated that translation of the piston 28 toward the first end 20 of the chamber 18 increases the distance of the gap 54. Conversely, translation of the piston 28 toward the second end 22 of the chamber 18 decreases the distance of the gap 54. Adjustment of the gap 54 is significant based on the dependency of the dampening force on this variable. Specifically, the dampening force may be expressed with the following equation:

$$F = \frac{3\pi\eta LD^3 v}{4\delta^3}$$

where $\eta$ represents the viscosity of the fluid; L represents the length of the piston 28; D represents the diameter of the piston 28; $\delta$ represents the gap 54 between the piston 28 and the inner wall 16; and v represents the velocity of the piston 28.

It can be seen from the equation above that the gap 54 is an important variable in determining the dampening force. The other variables cannot be readily adjusted without an overhaul of the piston dimensions and/or the viscosity of the fluid, etc. By adjusting the gap 54, an initial position of the piston 28 may be achieved to obtain a desirable dampening force. The desirable dampening force will depend on the particular application of use and is useful in setting mechanical characteristics of the overall system.

Advantageously, the embodiments described above provide a continuously gradual adjustment of the piston 28, and therefore the gap 54, in contrast to a step adjustment of an incremental value. The threaded relationship between the piston 28 and the press rod 40 facilitates gradual adjustment over the entire range of the threaded portion 48.

Figure 3:
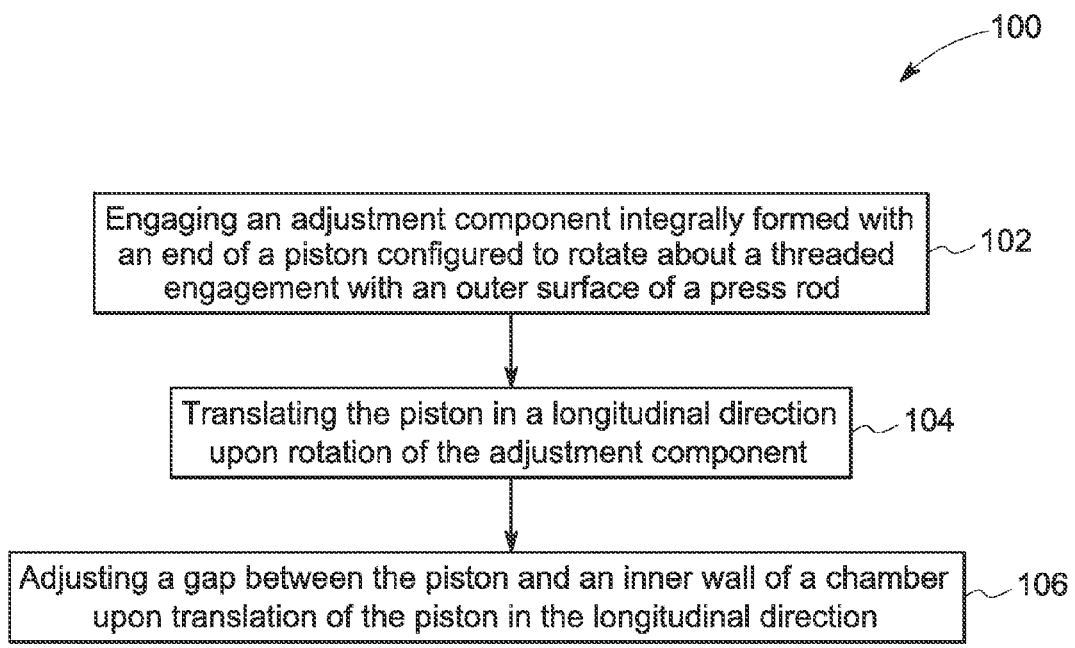
FIG. 3 is a flow diagram illustrating a method of adjusting an initial position of a piston of the hydraulic damper.

As illustrated in the flow diagram of FIG. 3, and with reference to FIGS. 1 and 2, a method of adjusting an initial position of a piston of a hydraulic damper 100 is also provided. The hydraulic damper 10 and associated structural components have been described above, such that additional description is not necessary. The method of adjusting an initial position of a piston of a hydraulic damper 100 includes engaging an adjustment component integrally formed with an end of a piston configured to rotate about a threaded engagement with an outer surface of a press rod 102. The method also includes translating the piston in a longitudinal direction upon rotation of the adjustment component 104. The method further includes adjusting a gap between the piston and an inner wall of a chamber upon translation of the piston in the longitudinal direction.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A hydraulic damper for an electrical switching apparatus comprising:
    a damper enclosure including an inner wall;
    a chamber defined by the inner wall, the chamber having a first end, a second end;
    a tapered portion of the chamber extending from a tapered portion initial end to a tapered portion terminal end, the tapered portion angled inwardly in a direction from the first end toward the second end of the chamber;
    a press rod at least partially disposed within the chamber, wherein the press rod is operatively coupled to the second end of the chamber with a resilient member;
    a piston having a piston outer surface and disposed within the chamber and having an initial position adjustable in a longitudinal direction of the chamber, the piston adjustable relative to the press rod using an adjustment component; and
    a gap defined by the piston outer surface and the inner wall, wherein adjustment of the piston in the longitudinal direction adjusts the gap.

2. The hydraulic damper of claim 1, the piston having a hollow portion, the press rod located within the hollow portion of the piston.

3. The hydraulic damper of claim 2, wherein the press rod comprises a threaded portion along a press rod outer surface, the piston in mechanical engagement with the threaded portion.

4. The hydraulic damper of claim 3, wherein the adjustment component is located along a length of the piston.

5. The hydraulic damper of claim 4, wherein the adjustment component is integrally formed with the piston.

6. The hydraulic damper of claim 4, wherein the adjustment component includes an outer surface having a hexagonal geometry.

7. A hydraulic damper enclosure comprising:
    a chamber defined by an inner wall of the hydraulic damper enclosure and having a first end and a second end, the chamber extending in a longitudinal direction of the hydraulic damper enclosure;
    a tapered portion of the chamber defining a varying cross-sectional area;
    a press rod disposed within the chamber, wherein the press rod is operatively coupled to the second end of the chamber with a resilient member;
    a piston having a piston outer surface and disposed within the chamber proximate the tapered portion; and
    an adjustable gap defined by the piston outer surface and the inner wall, wherein the gap is adjustable using an adjustment component that moves the piston relative to the press rod.

8. The hydraulic damper of claim 7, the piston having a hollow portion, wherein a portion of the press rod is located within the hollow portion.

9. The hydraulic damper of claim 8, wherein the piston is operatively coupled to the press rod.

10. The hydraulic damper of claim 8, wherein the press rod comprises a threaded portion along a press rod outer surface, the piston in mechanical engagement with the threaded portion.

11. The hydraulic damper of claim 10, wherein the adjustment component is located along a length of the piston and configured to facilitate rotation of the piston.

12. The hydraulic damper of claim 11, wherein the adjustment component is integrally formed with the piston.

13. The hydraulic damper of claim 11, wherein the adjustment component includes an outer surface having a hexagonal geometry.

14. A method of adjusting an initial position of a piston of a hydraulic damper, the method comprising:
    engaging an adjustment component operatively coupled to an end of a piston configured to rotate about a threaded engagement;
    translating the piston in a longitudinal direction upon rotation of the adjustment component, the piston translating relative to a press rod extending through the piston; and
    adjusting a gap defined by a piston outer surface and an inner wall of a chamber upon translation of the piston relative to the press rod in the longitudinal direction, wherein the chamber has a first end and a second end, wherein a tapered portion of the chamber extends from a tapered portion initial end to a tapered portion terminal end, wherein the tapered portion is angled inwardly in a direction from the first end toward the second end of the chamber, and wherein the press rod is operatively coupled to the second end of the chamber with a resilient member.

* * * * *